Jan. 11, 1944. E. S. CLANTON 2,339,000
NON-SLIP HOLDER FOR CAKE SOAP
Original Filed Sept. 27, 1941
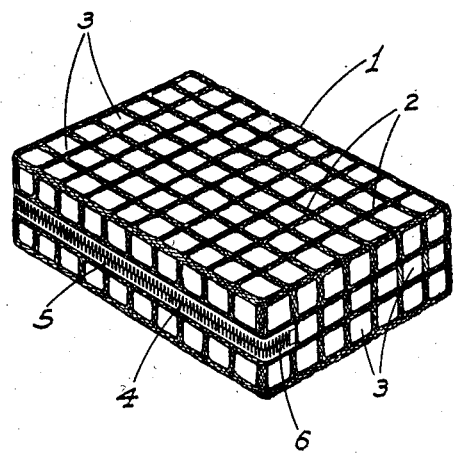
Inventor
*Earl S. Clanton*
By Patented Jan. 11, 1944

2,339,000

UNITED STATES PATENT OFFICE 2,339,000

NONSLIP HOLDER FOR CAKE SOAP

Earl S. Clanton, Fresno, Calif.

Original application September 27, 1941, Serial No. 412,666. Divided and this application March 13, 1943, Serial No. 479,035

2 Claims. (Cl. 45—28)

This invention relates in general to a household or domestic article, and in particular the invention is directed to a holder for cake soap for bath use or the like.

This application is a division of copending application, Serial No. 412,666, filed September 27, 1941, which has become U. S. Patent #2,319,847 on May 25, 1943.

One of the objects of this invention is to provide a holder for cake soap, which is designed to prevent slipping of the cake, when wet, from the hands of a user; the holder being in the form of a flexible envelope or cage, being relatively thin, and having a relatively wide or large mesh to permit the escape of dissolved soap.

A further object of this invention is to provide a non-slip holder for cake soap, which comprises a flexible, mesh envelope or cage of woven fabric, said cage being of a size and configuration to enclosingly engage about a cake of soap, and having an opening in one side thereof to permit passage of a cake of soap into said cage, said opening normally being closed by a small rust-proof endless slide fastener.

It is also an object of this invention to provide a non-slip holder for cake soap which comprises a mesh cage, as above, wherein said cage is woven from a relatively soft fabric, integrally and knotless.

A further object of the invention is to produce a simple and inexpensive device, and yet one which will be exceedingly effective for the purpose for which it is designed.

These objects I accomplish by means of such structure and relative arrangement of parts as will fully appear by a perusal of the following specification and claims.

The figure of the drawing is a perspective view of the invention.

Referring now more particularly to the characters of reference on the drawing, the non-slip holder for a cake of soap comprises an envelope or cage 1 of a size and configuration to engage about or encompass a cake of soap.

In the present embodiment, the cage is shown as being rectangular and relatively shallow, whereby to fit a standard size of toilet soap. The mesh cage is integral and is formed from a flexible material such as fiber, woven into spongy, cord-like webbing 2, as shown. The material used is preferably a cotton fiber which is soft. The mesh openings 3 are relatively large, with the spongy, cord-like webbing 2 therebetween quite narrow.

The cake of soap is passed into the cage 1 through a longitudinal slit 4 which extends from end to end of the cage along one side thereof and a short distance into said ends, as shown at 6; said slit being disposed centrally between opposite faces of the cage. The slit 4 is normally closed from end to end by a small rust-proof endless slide fastener 5. As the slit and slide fastener run into the ends of the cage, the slit can be more readily separated for the purpose of insertion of a cake of soap into said cage.

In use, it will be obvious that the mesh envelope or cage surrounding the cake of soap provides a slightly rough but relatively soft surface which prevents the cake of soap from slipping from the hands of the user. Also, by reason of the fact that the endless slide fastener is disposed in spaced relation from opposite faces of the cage, said fastener does not readily come into contact with the user's body which is engaged by one face or the other of the holder.

The arrangement of the slit 4 and endless slide fastener 5 centrally between the faces, and so that they may extend symmetrically along one side and into the ends of the cage, is readily obtained in manufacture by forming the ends of the cage with an odd number of longitudinal rows of mesh, and said side of the cage with an even number of longitudinal rows of mesh with the slit disposed centrally between the latter in matching relation to the central rows of mesh in said ends.

For the purpose of ornamentation the cage may be of different colors or combination of colors as may be desired.

Another advantage of the article is that when a full cake of soap is inserted in the holder small and unused pieces of soap may also be placed in the cage; the cage holding such small pieces with the large cake until all the pieces are consumed.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A non-slip holder for cake soap, comprising a flexible mesh cage including opposed faces connected together in unitary relation by spaced sides and ends, said ends having an odd number of longitudinal matching rows of mesh, one side of the cage having an even number of longitudinal rows of mesh and a central longitudinal slit extending from end to end of said side and between said last named rows, said slit corresponding to and matching the central row of mesh in said ends, and a relatively small endless slide fastener extending along and normally closing said slit for its full length.

2. A non-slip holder for cake soap, comprising a flexible mesh cage including opposed faces connected together in unitary relation by spaced sides and ends, said ends having an odd number of longitudinal matching rows of mesh, one side of the cage having an even number of longitudinal rows of mesh and a central longitudinal slit extending from end to end of said side and between said last named rows, said slit corresponding to and matching the central row of mesh in said ends, and a relatively small endless slide fastener extending along and normally closing said slit for its full length; said slit at its ends running a relatively short distance into the adjacent portions of the central rows of both ends, and said slide fastener being correspondingly extended and normally closing said end extensions of the slit.

EARL S. CLANTON.